Patented June 15, 1926.

1,588,823

UNITED STATES PATENT OFFICE.

WILLIAM TYRRELL, OF SEATTLE, WASHINGTON.

BRIQUETTING PROCESS.

No Drawing.    Application filed December 31, 1924.   Serial No. 759,153.

This invention relates to briquetting processes, and more especially to processes for manufacturing briquettes for fuel uses. The principal objects of the invention are to render the process of making briquettes appreciably cheaper and considerably more efficient as a fuel.

With the above and other objects in view which will appear as the description proceeds, the invention consists of the novel combination of ingredients and peculiar method of mixing as hereinafter described and claimed.

These objects are preferably accomplished by using substantially one part of diatomaceous earth, one part of caustic soda or concentrated lye, one hundred parts of finely ground coal, coke, or other combustible material, and sufficient warm water to moisten the mixture.

The diatomaceous earth is first placed in an open kettle or other retort and the caustic soda or concentrated lye is then added and thoroughly mixed therewith. Warm water is now added and the mass is agitated by continually stirring and a chemical action is produced. It will be understood that I do not confine myself to this or any other particular order of mixing or means of agitating the mass.

The mixture in the retort is then raised to from 212 degrees to 220 degrees Fahrenheit or thereabouts and held at this temperature for substantially thirty minutes. Sufficient boiling water is now added in accordance with the nature of the material to be briquetted. For example, approximately three and a half pints or fifty-six ounces of water is added to about twenty-nine ounces of the mixture, varying with the consistency of the combustible material that is to be used.

I then take about two per cent of the foregoing binder and add same to approximately one hundred parts of finely ground coal, coke, or other fuel. The result of the mixture will be a moist plastic mass which I compress into briquettes of any desired shape or form.

In preparing the combustible material for my process, I prefer to pass about fifty per cent of same through a 20-mesh screen and about fifty per cent through a 10-mesh screen. It will be obvious that the best results are obtained by using a sufficient quantity of the finely ground material to fill the voids between the grains of the coarser material. The percentage of binders to be used will of course vary with different coals and other materials. It ordinarily takes a slightly larger amount of same for coke than for coal.

While I have described my process with some particularity in regard to the successive steps and specific ingredients, it will be understood that I intend no limitations and that such changes may be resorted to as are within the scope and spirit of the invention. Other amorphous forms of silica may be substituted for diatomaceous earth, such as infusorial earth, "mountain meal", "tripoli", or any other substance that is equally suited to accomplish the desired purpose.

Having thus described my invention, what I claim and desire to secure by Letters Patent of the United States is:—

1. In a briquetting process, the mixture of one part diatomaceous earth, one part caustic soda, sufficient warm water to moisten, stirring said mixture, heating to substantially two hundred and twenty degrees Fahrenheit for approximately thirty minutes, sufficient hot water to form a moist plastic mass, mixing about two per cent of said mass with substantially one hundred parts of finely ground combustible material, and compressing the mixture into briquettes.

2. In a briquetting process, the mixture of one part diatomaceous earth, with one part of caustic soda or concentrated lye, sufficient warm water to thoroughly moisten, agitation and thorough mixture of the mass, heating to substantially two hundred and twenty degrees Fahrenheit for approximately thirty minutes, adding sufficient boiling water in accordance with the nature of the combustible material to form a moist plastic mass, mixing substantially two per cent of the mass with approximately one hundred parts of finely ground coal, coke or other combustible material, and compressing the mixture into briquettes.

In witness whereof, I hereunto subscribe my name this 26th day of December A. D. 1924.

WILLIAM TYRRELL.